United States Patent [19]

Williams

[11] Patent Number: 4,600,944
[45] Date of Patent: Jul. 15, 1986

[54] LOW COST SYNCHRONIZING SIGNAL SEPARATOR

[75] Inventor: Gregory A. Williams, Elk Grove Village, Ill.

[73] Assignee: Zenith Electronics Corporation, Glenview, Ill.

[21] Appl. No.: 638,091

[22] Filed: Aug. 6, 1984

[51] Int. Cl.⁴ .................. H04N 5/10; H04N 5/08; H03K 5/22
[52] U.S. Cl. .................. 358/154; 358/153; 328/63; 328/111; 328/139; 307/234
[58] Field of Search .............. 358/153, 154, 155; 328/111, 112, 139, 63; 307/234

[56] References Cited

U.S. PATENT DOCUMENTS 3,996,586 12/1976 Dillon et al. ............... 328/111
4,370,617  1/1983 Brandt ....................... 328/139

FOREIGN PATENT DOCUMENTS 0051814 4/1977 Japan ........................ 358/154

Primary Examiner—James J. Groody
Assistant Examiner—Michael D. Parker

[57] ABSTRACT

A sync signal separator includes a first monostable flip-flop, connected to be positive-edge triggered and non-retriggerable, with a first timing circuit for generating horizontal output pulses of slightly greater duration than input horizontal sync pulses, a second monostable flip-flop, connected to be negative-edge triggered and nonretriggerable, having a second timing circuit for generating a time duration greater than the normal duration of a vertical sync pulse and an OR gate having inputs coupled to receive input sync pulses and the output of the second monostable flip-flop for controlling the enable input of the second monostable flipflop. The output of the first monostable flipflop produces the horizontal output pulses and the output of the second monostable flipflop produces the vertical output pulses.

3 Claims, 2 Drawing Figures

LOW COST SYNCHRONIZING SIGNAL SEPARATOR

BACKGROUND OF THE INVENTION AND PRIOR ART

This invention relates in general to synchronizing signal separators for use in television receiver systems and particularly to digital type synchronizing signal separators.

Synchronizing signal separators for separating horizontal synchronizing pulses and vertical synchronizing pulses for use in controlling the visual display of televised information are well known in the art. The horizontal pulses are generally very narrow whereas the vertical blanking interval of the televised display is determined by a series of fairly broad pulses which are subsequently integrated to derive a vertical blanking pulse.

The circuit of the invention provides a very simple and economical digital type sync signal separator.

OBJECTS OF THE INVENTION

The principal object of this invention is to provide a novel synchronizing signal separator circuit.

Another object of the invention is to provide a low cost, simple sync signal separator.

SUMMARY OF THE INVENTION

The sync signal separator circuit of the invention comprises an input terminal for receipt of input pulses consisting of narrow pulses and broad pulses, first means responsive to the leading edges of the narrow input pulses for producing first output pulses at a first output terminal and second means, supplied with both the input pulses and the output pulses, and being responsive to the trailing edges of the output pulses in the presence of input pulses, for producing second output pulses at a second output terminal.

BRIEF DESCRIPTION OF THE DRAWING

Further objects and advantages of the invention will become apparent upon reading the following description thereof in conjunction with the drawing in which.

DESCRIPTION OF THE PREFERRED EMBODIMENT

Figure 1:
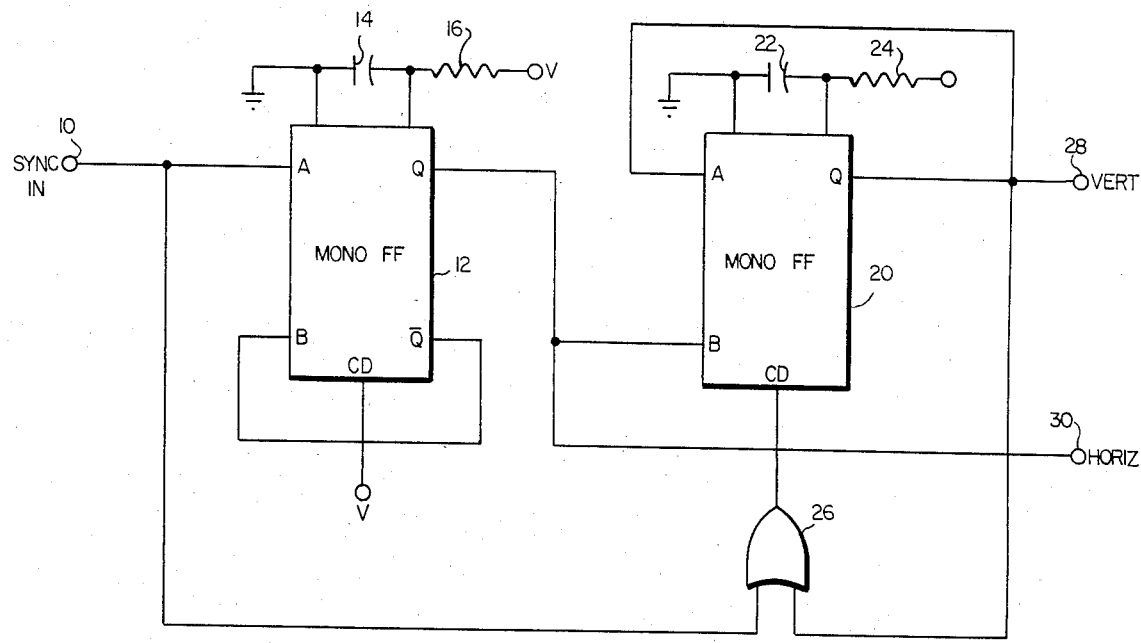
FIG. 1 is a schematic diagram of a synchronizing signal separator circuit constructed in accordance with the invention.

The circuit of the invention incorporates two monostable flip-flops, a pair of resistance-capacitance (RC) timing networks and an OR gate. An input terminal 10 has supplied thereto unseparated horizontal and vertical synchronizing (sync) pulse information. Input terminal 10 is connected to the A terminal of a flip-flop 12 (FF 12) and to a first input of an OR gate 26. FF 12 has its $\bar{Q}$ terminal connected to its B terminal which renders it a positive-edge nonretriggerable device. Its timing circuit terminals are supplied from a source of positive potential through a resistor 16 and a capacitor 14. The RC timing circuit serves to stretch out the input pulses due to the timing delay, which maintains the Q terminal output signal from FF 12 after the input signal terminates. Its CD or enable terminal is also connected to a source of positive potential. The Q terminal of FF 12 is coupled to a horizontal output terminal 30 of the sync separator and to the B terminal of an other monostable flip-flop 20. The Q terminal of FF 20 supplies a vertical output terminal 28 of the sync separator and is also connected back to its A terminal and to the second input of OR gate 26. The Q to A terminal connection of FF 20 renders this device negative-edge nonretriggerable. Its timing circuit is connected to a positive voltage through a resistor 24 and a capacitor 22 for producing a second time duration that is much longer than the timing duration produced for FF 12, specifically it is about twenty microseconds longer than a normal vertical sync pulse. The output of OR 26 is coupled to the CD input of FF20.

Figure 2:
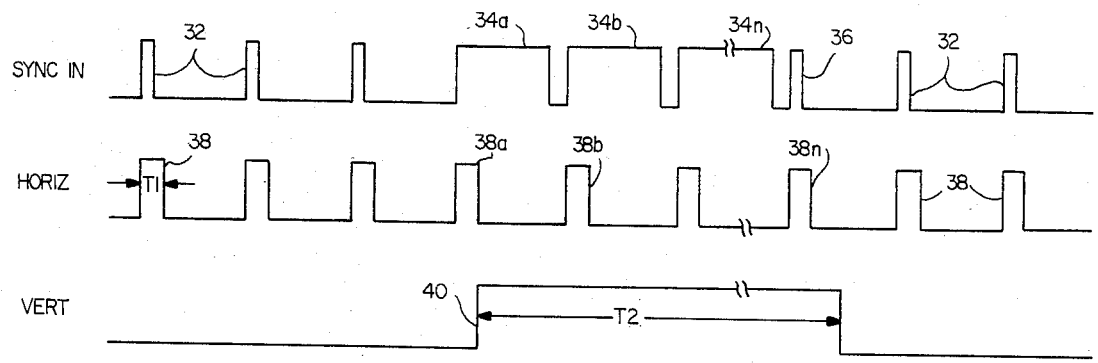
FIG. 2 is a series of waveforms showing the input and output signals for the circuit of FIG. 1.

In FIG. 2 the input and output waveforms are shown. It will be recognized that the sync input waveform at terminal 10 consists of a series of relatively narrow horizontal pulses and relatively broad "vertical" pulses for defining the vertical blanking interval. The sync input signal depicted covers a portion of the equalizing pulses, part of the field sync broad pulses and a portion of the following equalizing pulses. While the repetition rate of the narrow equalizing pulses 32 in FIG. 2 is actually twice the horizontal line frequency of a conventional NTSC television signal, they will be referred to as horizontal pulses.

Assume that the Q terminals are high and the $\bar{Q}$ terminals low. The positive-going edge of a pulse 32 at terminal A of FF 12 results in its Q terminal going high as indicated by the first pulse in the waveform labelled "HORIZ" of FIG. 2. The FF 12 is then "timed-out" by the RC timing circuit of resistor 16 and capacitor 14 for a time equal to T1 to produce a pulse 38 at horizontal output terminal 30 and at the B input of FF 20. Pulse 32 is also supplied to one input of OR 26. Since the other input to OR 26 is from Q of FF 20, which is low, the output of OR 26 goes high. The high on the CD input of FF 20 enables FF 20. It will be recalled that FF 20 is negative-edge triggered and there is no negative edge present at its B input at the time its CD input goes high. Hence, FF 20 does not change state and vertical output terminal 28 remains at a low potential. It will be seen that the broader horizontal pulse 38 assures that the negative edge of the input pulse 32 does not occur when FF 20 is enabled and also provides a better output pulse for use by later circuitry (not shown). In digital circuits especially, the clearly defined relatively broad horizontal output pulses 38 are very desirable.

Subsequent input pulses 32 have a similar effect and generate corresponding horizontal output pulses 38 at horizontal output terminal 30. When broad "vertical" pulse 34a is presented to input terminal A of FF 12, horizontal pulse 38a is produced which is, in all respects, the same as the other horizontal pulses 38. However, because pulse 34a persists for a time during which the negative edge of pulse 38a occurs, input terminal B of FF 20 sees a negative edge while its CD input is high because pulse 34a is also supplied to the input of OR 26. Thus, FF 20 is triggered and its Q output goes high generating the beginning of a vertical pulse 40, which is supplied to vertical output terminal 28, to terminal A of FF 20 and to the input of OR 26. At this point, both inputs of OR 26 are high resulting in its output remaining high, rendering its CD input high and keeping FF 20 enabled. Occurrence of the trailing edge of pulse 34a has no effect since FF 20 is nonretriggerable during its timing period T2 which is selected to be slightly greater than the duration of a vertical sync pulse. Subsequently, broad pulse 34b...34n are presented to input terminal A of FF 12 and generates horizontal pulses 38b...38n, the trailing edge of which have no effect on nonretriggerable FF 20. Thus, FF 20 retains its Q terminal at a high level as illustrated by pulse 40. The last of the broad vertical pulses 34n occurs just before the second timing circuit T2 times-out FF 20. This entire period is illustrated by T2. Broad vertical pulse 34n is followed by a subsequent narrow horizontal pulse 36 which gives rise to a horizontal pulse 38n, the trailing edge of which extends beyond the trailing edge of pulse 36. However FF 20 is effectively disabled as it continues timing out during the period T2 and terminates the vertical pulse 40. The feedback circuit from A of FF 20 to the input of OR 26 is provided for tolerance purposes.

What has been described is a novel, simple, low cost sync separator circuit which digitally produces separated horizontal and vertical sync pulses from a synchronizing input signal. It is recognized that numerous modifications and changes in the described embodiment of the invention will be apparent to those skilled in the art without departing from the true spirit and scope thereof. The invention is to be limited only as defined in the claims.

What is claimed is:

1. A synchronizing signal separator comprising:
   an input terminal for receipt of input pulses consisting of narrow pulses and broad pulses;
   first means including a first monostable flip-flop responsive to the leading edges of said pulses for producing first output pulses at a first output terminal, said first monostable flip-flop being positive edge nonretriggerable and including a first timing circuit for determining a first duration of said first output pulses at said first output terminal; and
   second means including a second monostable flip-flop receiving said input pulses and said first output pulses and being responsive to the trailing edges of said first output pulses in the presence of said input pulses for producing second output pulses at a second output terminal, said second monostable flip-flop being negative edge nonretriggerable and including a second timing circuit for determining a second duration in excess of the duration of said broad pulses.

2. The separator of claim 1 further including gate means having an output coupled to the enable input of said second flip-flop and a pair of inputs, one input receiving said input pulses and the other input receiving said second output pulses.

3. A synchronizing signal separator comprising:
   an input terminal for receiving input pulses including narrow horizontal pulses and broad vertical pulses;
   a first monostable flip-flop connected in a nonretriggerable positive edge mode for receiving said input pulses and for supplying horizontal output pulses therefrom of greater duration than said narrow horizontal input pulses;
   a first timing circuit coupled to said monostable flip-flop for determining a first duration for said horizontal output pulses;
   a second monostable flip-flop connected in a negative edged nonretriggerable mode and having its input connected to received said horizontal output pulses;
   a second timing circuit for said second monostable flip-flop for producing a duration in excess of the duration of said vertical pulses; and
   an OR gate having a pair of inputs one, receiving said input pulses and another coupled to said second monostable flip-flop for receiving the output thereof, and an output coupled to the enabled input of said second monostable flip-flop.

* * * * *